United States Patent [19]

Cleary et al.

[11] Patent Number: 4,560,675

[45] Date of Patent: Dec. 24, 1985

[54] ADSORBENT FOR SEPARATING FATTY ACIDS FROM ROSIN ACIDS

[75] Inventors: Michael T. Cleary, Elmhurst, Ill.; William C. Laughlin, Edmond, Okla.

[73] Assignee: UOP Inc., Des Plaines, Ill.

[21] Appl. No.: 686,498

[22] Filed: Dec. 26, 1984

Related U.S. Application Data

[62] Division of Ser. No. 408,100, Aug. 13, 1982, Pat. No. 4,495,106.

[51] Int. Cl.$^4$ .......... B01J 20/10

[52] U.S. Cl. .......... 502/407

[58] Field of Search .......... 502/407, 233

[56] References Cited

U.S. PATENT DOCUMENTS

| | | | |
|---|---|---|---|
| 4,283,306 | 8/1981 | Herkes | 502/202 |
| 4,308,172 | 12/1981 | McDaniel | 502/202 |
| 4,309,275 | 1/1982 | Mulaskey | 208/109 |
| 4,309,276 | 1/1982 | Miller | 208/109 |

*Primary Examiner*—Carl F. Dees

*Attorney, Agent, or Firm*—Thomas K. McBride; William H. Page, II; John G. Tolomei

[57] ABSTRACT

This invention sets forth a molecular sieve comprising silicalite in a silica matrix the precursor of said molecular sieve comprising silicalite powder dispersed in colloidal amorphous silica, said precursor having been gelled and then treated in a manner effecting substantially complete elimination of hydroxyl groups on said molecular sieve along with a method of manufacturing the sieve.

15 Claims, 1 Drawing Figure

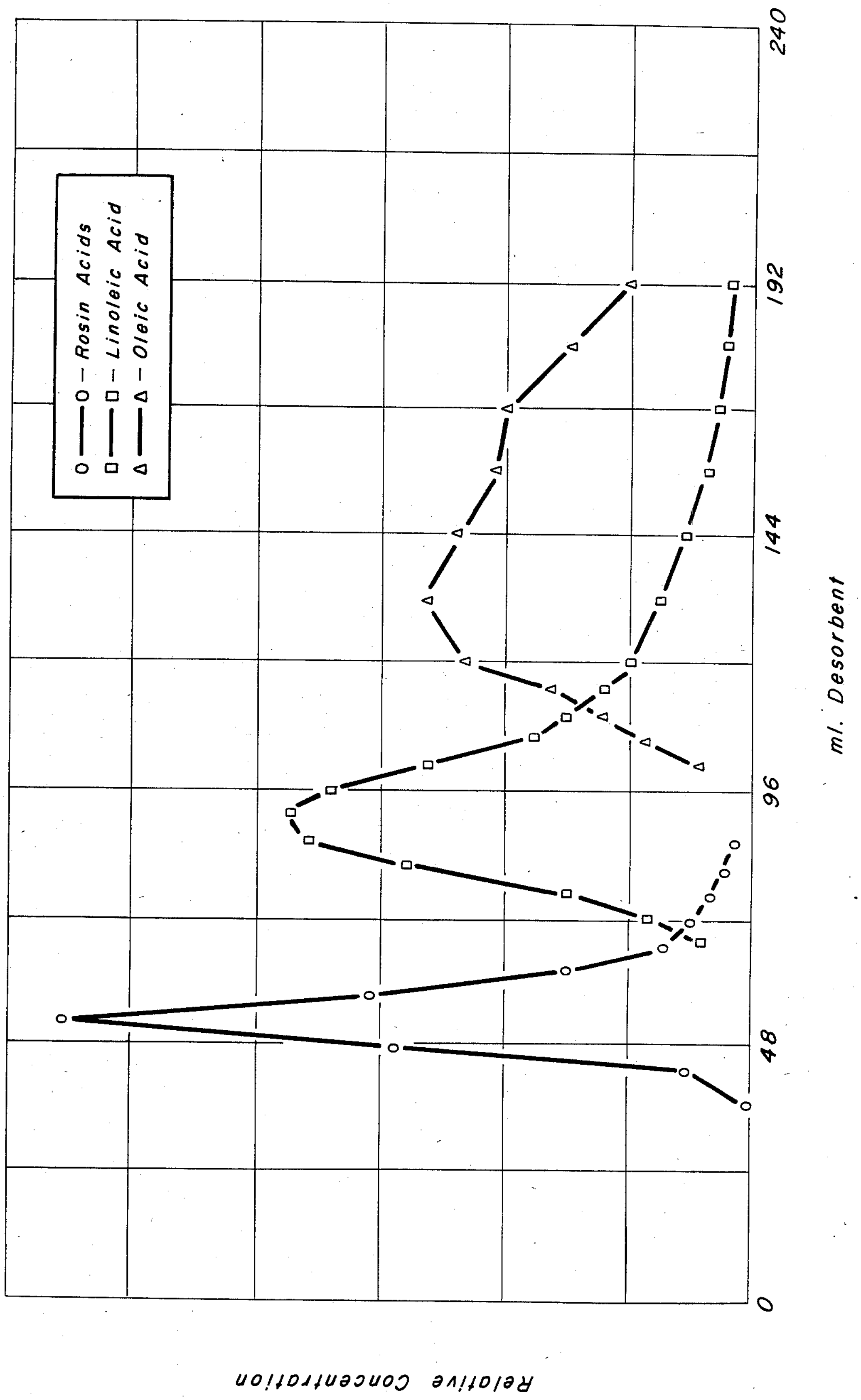
Rosin Acids
Linoleic Acid
Oleic Acid
0
48
96
144
192
240
ml. Desorbent
Relative Concentration

ADSORBENT FOR SEPARATING FATTY ACIDS FROM ROSIN ACIDS

CROSS-REFERENCE TO RELATED APPLICATION

This application is a division of prior copending application Ser. No. 408,100 filed Aug. 13, 1982 now U.S. Pat. No. 4,495,106, incorporated herein by reference.

BACKGROUND OF THE INVENTION

1. Field of the Invention

The field of art to which this invention pertains is a molecular sieve. More specifically, the invention relates to a molecular sieve for separating fatty acids from rosin acids comprising silicalite in a silica matrix.

2. Description of the Prior Art

It is well known in the separation art that certain crystalline aluminosilicates can be used to separate hydrocarbon types from mixtures thereof. As a few examples, a separation process disclosed in U.S. Pat. Nos. 2,985,589 and 3,201,491 uses a type A zeolite to separate normal paraffins from branched chain paraffins, and processes described in U.S. Pat. Nos. 3,265,750 and 3,510,423 use type X or type Y zeolites to separate olefinic hydrocarbons from paraffinic hydrocarbons. In addition to their use in processes for separating hydrocarbon types, X and Y zeolites have been employed in processes to separate individual hydrocarbon isomers. As a few examples, absorbents comprising X and Y zeolites are used in the process described in U.S. Pat. No. 3,114,782 to separate alkyl-trisubstituted benzene isomers; in the process described in U.S. Pat. No. 3,864,416 to separate alkyl-tetrasubstituted monocyclic aromatic isomers; and in the process described in U.S. Pat. No. 3,668,267 to separate specific alkyl-substituted naphthalenes.

Because of the commercial importance of para-xylene, perhaps the more well-known and extensively used hydrocarbon isomer separation processes are those for separating para-xylene from a mixture of $C_8$ aromatics. In processes described in U.S. Pat. Nos. 3,558,730; 3,558,732; 3,626,020; 3,663,638; and 3,734,974, for example, molecular sieves comprising particular zeolites are used to separate para-xylene from feed mixtures comprising para-xylene and at least one other xylene isomer by selectively adsorbing para-xylene over the other xylene isomers.

In contrast, this invention relates to the separation of non-hydrocarbons and more specifically to the separation of fatty acids from rosin acids. Substantial uses of fatty acids are in the plasticizer and surface active agent fields. Derivatives of fatty acids are of value in compounding lubricating oil, as a lubricant for the textile and molding trade, in special lacquers, as a water-proofing agent, in the cosmetic and pharmaceutical fields, and in biodegradable detergents.

It is known from U.S. Pat. No. 4,048,205 to use type X and type Y zeolites for the separation of unsaturated from saturated esters of fatty acids. The type X and type Y zeolites, however, will not separate the esters of rosin acids found in tall oil from the esters of fatty acids nor the free acids, apparently because the pore size of those zeolites (over 7 angstroms) are large enough to accommodate and retain the relatively large diameter molecules of esters of rosin acids as well as the smaller diameter molecules of esters of fatty acids (as well as the respective free acids). Type A zeolite, on the other hand, has a pore size (about 5 angstroms) which is unable to accommodate either of the above type esters (or free acids) and is, therefore, unable to separate them. An additional problem when a zeolite is used to separate free acids is the reactivity between the zeolite and free acids.

It is also known that silicalite, a non-zeolitic hydrophobic crystalline silica molecular sieve, exhibits molecular sieve selectivity for a fatty acid with respect to a rosin acid, particularly when used with a specific displacement fluid. Silicalite, however, a fine powder, must be bound in some manner to enable its practical use as a molecular sieve. All binders heretofore attempted are not suitable for use in separating the components of tall oil because of the binder's reactivity of interference with the separation. We have discovered a binder which when incorporated with the silicalite provides a new molecular sieve uniquely suitable for the separation of the components of tall oil.

SUMMARY OF THE INVENTION

In brief summary, the invention is, in one embodiment, a molecular sieve comprising silicalite in a silica matrix. The precursor of the molecular sieve comprises silicalite powder dispersed in colloidal amorphous silica. The precursor is gelled and then treated in a manner effecting substantially complete elimination of hydroxyl groups on the molecular sieve.

In another embodiment, our invention is a method of manufacturing a molecular sieve comprising silicalite in a silica matrix, which method comprises: (a) mixing silicalite powder into an aqueous colloidal dispersion of amorphous particles; (b) gelling the mixture; and (c) treating the gelled mixture in a manner effecting complete substantially elimination of hydroxyl groups on the molecular sieve.

Other embodiments of our invention encompass details about molecular sieves and methods of manufacture.

DESCRIPTION OF THE INVENTION

At the outset the definitions of various terms used throughout the specification will be useful in making clear the environment in which the molecular sieve is used.

A "feed mixture" is a mixture containing one or more extract components and one or more raffinate components to be separated by a molecular sieve. The term "feed stream" indicates a stream of a feed mixture which passes to the molecular sieve used in a separation process.

An "extract component" is a compound or type of compound that is retained by the molecular sieve while a "raffinate component" is a compound or type of compound that is not retained. In this process a fatty acid is an extract component and a rosin acid is a raffinate component. The term "displacement fluid" shall mean generally a fluid capable of displacing an extract component. The term "displacement fluid stream" or "displacement fluid input stream" indicates the stream through which displacement fluid material passes to the molecular sieve. The term "raffinate stream" or "raffinate output stream" means a stream through which a raffinate component is removed from the molecular sieve. The composition of the raffinate stream can vary from essentially a 100% displacement fluid to essentially 100% raffinate components. The term "extract stream" or "extract output stream" shall mean a stream through which an extract material which has been displaced by a displacement fluid is removed from the molecular sieve. The composition of the extract stream, likewise, can vary from essentially 100% displacement fluid to essentially 100% extract components. At least a portion of the extract stream and preferably at least a portion of the raffinate stream from the separation process are passed to separation means, typically fractionators, where at least a portion of displacement fluid and diluent is separated to produce an extract product and a raffinate product. The terms "extract product" and "raffinate product" mean products produced by the process containing, respectively, an extract component and a raffinate component in higher concentrations than those found in the extract stream and the raffinate stream. Although it is possible using the molecular sieve of this invention to produce a high purity, fatty acid product or a rosin acid product (or both) at high recoveries, it will be appreciated that an extract component is never completely retained by the molecular sieve, nor is a raffinate component completely not retained by the molecular sieve. Therefore, varying amounts of a raffinate component can appear in the extract stream and, likewise, varying amounts of an extract component can appear in the raffinate stream. The extract and raffinate streams then are further distinguished from each other and from the feed mixture by the ratio of the concentrations of an extract component and a raffinate component appearing in the particular stream. More specifically, the ratio of the concentration of a fatty acid to that of non-retained rosin acid will be lowest in the raffinate stream, next highest in the feed mixture, and the highest in the extract stream. Likewise, the ratio of the concentration of a rosin acid to that of the fatty acid will be highest in the raffinate stream, next highest in the feed mixture, and the lowest in the extract stream.

The term "selective pore volume" of the molecular sieve is defined as the volume of the molecular sieve which selectively retains an extract component from the feed mixture. The term "non-selective void volume" of the molecular sieve is the volume of the molecular sieve which does not selectively retain an extract component from the feed mixture. This latter volume includes the cavities of the molecular sieve which admit raffinate components and the interstitial void spaces between molecular sieve particles. The selective pore volume and the non-selective void volume are generally expressed in volumetric quantities and are of importance in determining the proper flow rates of fluid required to be passed into an operational zone for efficient operations to take place for a given quantity of molecular sieve.

Before considering feed mixtures which can be contacted with the molecular sieve of this invention, brief reference is first made to the terminology. The fatty acids are a large group of aliphatic monocarboxylic acids, many of which occur as glycerides (esters of glycerol) in natural fats and oils. Although the term "fatty acids" has been restricted by some to the saturated acids of the acetic acid series, both normal and branched chain, it is now generally used, and is so used herein, to include also related unsaturated acids, certain substituted acids, and even aliphatic acids containing alicyclic substituents. The naturally occurring fatty acids with a few exceptions are higher straight chain unsubstituted acids containing an even number of carbon atoms. The unsaturated fatty acids can be divided, on the basis of the number of double bonds in the hydrocarbon chain, into monoethanoid, diethanoid, triethanoid, etc. (or monoethylenic, etc.). Thus the term "unsaturated fatty acid" is a generic term for a fatty acid having at least one double bond, and the term "polyethanoid fatty acid" means a fatty acid having more than one double bond per molecule. Fatty acids are typically prepared from glyceride fats or oils by one of several "splitting" or hydrolytic processes. In all cases, the hydrolysis reaction may be summarized as the reaction of a fat or oil with water to yield fatty acids plus glycerol. In modern fatty acid plants, this process is carried out by continuous high pressure, high temperature hydrolysis of the fat. Starting materials commonly used for the production of fatty acids include coconut oil, palm oil, inedible animal fats, and the commonly used vegetable oils, soybean oil, cottonseed oil and corn oil.

The source of fatty acids with which the present invention is primarily concerned is tall oil, a by-product of the wood pulp industry, usually recovered from pine wood "black liquor" of the sulfate or Kraft paper process. Tall oil contains about 50–60% fatty acids and about 34–40% rosin acids. The fatty acids include oleic, linoleic, palmitic and stearic acids. Rosin acids, such as abietic acid, are monocarboxylic acids having a molecular structure comprising carbon, hydrogen and oxygen with three fused six-membered carbon rings, which accounts for the much larger molecular diameter of rosin acids as compared to fatty acids. Feed mixtures which can be charged to this process may contain, in addition to esters of the components of tall oil, a diluent material that is not retained by the molecular sieve and which is preferably separable from the extract and raffinate output streams by fractional distillation. When a diluent is employed, the concentration of diluent in the mixture of diluent and acids will preferably be from a few vol. % up to about 75 vol. % with the remainder being fatty acids and rosin acids. Although it has been previously discovered that silicalite is effective for separating esters of fatty and rosin acids, separation of the free acids using silicalite has not heretofore been accomplished.

Displacement fluids used in various prior art adsorptive and molecular sieve separation processes vary depending upon such factors as the type of operation employed. In separation processes which are generally operated continuously at substantially constant pressures and temperatures to ensure liquid phase, and which employ a molecular sieve, the displacement material must be judiciously selected to satisfy many criteria. First, the displacement material should displace an extract component from the molecular sieve with reasonable mass flow rates but yet allow access of an extract component into the molecular sieve so as not to unduly prevent an extract component from displacing the displacement material in a following separation cycle. Displacement fluids should additionally be substances which are easily separable from the feed mixture that is passed into the process. Both the raffinate stream and the extract stream are removed from the molecular sieve in admixture with displacement fluid and without a method of separating at least a portion of the displacement fluid, the purity of the extract product and the raffinate product would not be very high nor would the displacement fluid be available for reuse in the process. It is therefore contemplated that any displacement fluid material used with this molecular sieve will preferably have a substantially different average boiling point than that of the feed mixture to allow separation of at least a portion of displacement fluid from feed components in the extract and raffinate streams by simple fractional distillation, thereby permitting reuse of displacement fluid. The term "substantially different" as used herein shall mean that the difference between the average boiling points between the displacement fluid and the feed mixture shall be at least about 5° C. The boiling range of the displacement fluid may be higher or lower than that of the feed mixture. Finally, displacement fluids should also be materials which are readily available and therefore reasonable in cost. We have found displacement fluids comprising organic acids to be effective with our molecular sieve. In particular, short chain organic acids having from 2 to 5 carbon atoms are preferred when, as discussed hereinafter, a diluent is used.

It has been observed that even silicalite may be ineffective in separating fatty and rosin acids upon reuse of the molecular sieve bed for separation following the displacement step. When displacement fluid is present in the bed, selective retention of the fatty acid may not occur. It is hypothesized that the displacement fluid, particularly an organic acid which is the most effective displacement fluid, takes part in or even catalyzes hydrogen-bonded dimerization reactions in which there is an alignment between the molecules of the fatty and rosin acids and, perhaps, the molecules of the displacement fluid. These dimerization reactions may be represented by the formulas:

$$FA+FA \rightleftharpoons (FAFA)$$

$$RA+RA \rightleftharpoons (RARA)$$

$$FA+RA \rightleftharpoons (FARA)$$

where FA and RA stand for fatty acids and rosin acids, respectively. The organic acid displacement fluid molecules should probably also be considered reactants and product constituents in the above equations. The dimers would preclude separation of the fatty and rosin acids by blocking access of the former into the pores of the molecular sieve. This hindrance to separation caused by the presence of dimers does not appear to be a significant problem in the aforementioned process for separation of esters of fatty and rosin acids.

It has been discovered that the above dimerization reactions may be minimized, at least to the extent required to enable separation of the rosin and fatty acids, by first flushing the molecular sieve with a suitable diluent. The diluent serves to remove displacement fluid at least from the non-selective void volume of the molecular sieves. Proper selection first requires solubility of the feed stream components in the diluent as well as easy separation of the diluent by conventional means, as with the displacement fluid.

It has also been discovered that even the above preflush may be unnecessary if the displacement fluid comprises the organic acid in solution with a properly selected diluent. There are diluents which exhibit the property of minimizing dimerization. The measure of this property was found to be the polarity index of the liquid. Polarity index is as described in the article, "Classification of the Solvent Properties of Common Liquids"; Snyder, L., *J. Chromatography,* 92, 223 (1974), incorporated herein by reference. The minimum polarity index of the displacement fluid diluent, if pre-flush is to be avoided, is 3.5, particularly when the displacement fluid is a short chain organic acid as discussed above. The diluent should comprise from about 50 to about 95 liquid volume percent of the displacement fluid. Polarity indexes for certain selected solvents are as follows:

| SOLVENT | POLARITY INDEX |
|---|---|
| Isooctane | −0.4 |
| n-Hexane | 0.0 |
| Toluene | 2.3 |
| p-Xylene | 2.4 |
| Benzene | 3.0 |
| Methylethylketone | 4.5 |
| Acetone | 5.4 |

The molecular sieve which is the object of this invention comprises silicalite. As previously mentioned, silicalite is a hydrophobic crystalline silica molecular sieve. Silicalite is disclosed and claimed in U.S. Pat. Nos. 4,061,724 and 4,104,294 to Grose et al., incorporated herein by reference. The silicalite is in a silica matrix the precursor of the molecular sieve comprising silicalite powder dispersed in colloidal amorphous silica, the precursor having been gelled and then treated in a manner effecting substantially complete elimination of hydroxyl groups on the molecular sieve. As previously mentioned, silicalite is a hydrophobic crystalline silica molecular sieve. Due to its aluminum-free structure, silicalite does not show ion-exchange behavior, and is hydrophobic and organophilic. Silicalite thus comprises a molecular sieve, but not a zeolite. Silicalite is uniquely suitable for the separation of fatty and rosin acids for the presumed reason that its pores are of a size and shape that enable the silicalite to function as a molecular sieve, i.e., accept the molecules of fatty acids into its channels or internal structure, while rejecting the molecules of rosin acids. A detailed discussion of silicalite may be found in the article "Silicalite, A New Hydrophobic Crystalline Silica Molecular Sieve": *Nature,* Vol. 271, Feb. 9, 1978, incorporated herein by reference.

It is essential to the present invention that the silicalite be bound by silica, i.e. be in a silica matrix. The invention requires the incorporation of the silicalite into the silica by dispersing silicalite powder into a colloidal amorphous silica, to obtain a precursor, gelling the precursor, and then treating the gel in a manner effecting substantially complete elimination of hydroxyl groups on the silicalite and silica matrix. The colloidal amorphous silica comprises an aqueous colloidal dispersion of amorphous silica particles and the gelation is preferably effected by removing water from the dispersion, although other means of gelling may be used, such as changing pH or adding a salt or water miscible organic solvent. The silicalite should be present in the silica matrix in amounts ranging from about 75 wt. % to about 98 wt. % silicalite based on volatile free composition. Prior to the treatment of the gel to eliminate hydroxyl groups it is preferably extruded while still in a plastic state and then broken into discrete particles. The plastic state will occur during at least a portion of the time water is being removed to achieve gelling. Following treatment, the particles may be further ground to a smaller size more physically suitable for use in the particular separation scheme employed, typically about 16–60 mesh (Standard U.S. Mesh).

The colloidal amorphous silica preferred for use in the present invention is that marketed by Du Pont Company under the trademark "Ludox." Ludox colloidal silica is described as discrete uniform spheres of silica which have no internal surface area or detectable crystallinity dispersed in an alkaline medium which reacts with the silica surface to produce a negative charge. The pH of the alkaline medium is maintained from about 8.5 to about 11.0. The stabilizing cations in the alkaline medium may comprise sodium or ammonium ions. The concentration of silica in the colloidal dispersion may comprise from about 30 wt. % to about 50 wt. % based on $SiO_2$.

The Du Pont Company literature describing Ludox colloidal silica states that during drying the hydroxyl groups on the surface of the silica particles condense by splitting out water to form siloxane bonds (Si—O—Si) resulting in coalescence, interbonding and particles which are chemically inert and heat-resistant. It was found, however, that mere drying of the silica-bound silicalite at conditions accepted in the art to be drying conditions, i.e. heating in air in an oven at a temperature slightly above 100° C., produces a molecular sieve unacceptable for use in separating the components of tall oil. Such a molecular sieve exhibits reactivity for the fatty and rosin acids and the separation achieved is very poor in that there are severe tailings of the rosin acid components into the fatty acid components. The reason hypothesized for such behavior is that the statements in the Du Pont Company literature concerning the formation of siloxane bonds during conventional drying are substantially true, however, there is still a very minute amount of hydroxyl groups (or ammonium groups where the stabilizing cations are ammonium ions) left on the particles which for most practical purposes are of no consequence, but which render the adsorbent completely unsuitable for the separation of fatty and rosin acids. It should also be mentioned at this point that other binders for silicalite have been tried, but with equally poor results. Organic binders such as polyvinyl alcohol are unsuitable, probably because of the presence of hydroxyl groups. Natural clay binders exhibit selectivity for various constituents of tall oil and therefore interfere with the effect of the silicalite.

It is therefore necessary to treat the gelled silica-bound silicalite as aforesaid, to eliminate the hydroxyl groups and replace them by siloxane bonds. The resulting silicalite in a silica matrix molecular sieve obtained is uniquely suitable for separation of tall oil components since it achieves the excellent separation of pure silicalite and, at the same time, provides a physically strong and stable molecular sieve suitable for commercial separation applications.

There are numerous ways of treating the gelled silica-bound silicalite to achieve substantially complete elimination of hydroxyl groups. One way is thermal treatment at a temperature of from about 450° C. to about 1000° C. for a minimum time of from about 3 hours to about 48 hours which may occur in the presence of oxygen, nitrogen and/or hydrogen. Another way is by first contacting the molecular sieve with an alcohol, such as ethanol, and then thermally treating the molecular sieve at elevated temperature (in excess of about 350° C.) in the presence of oxygen. A third way of eliminating hydroxyl groups is by chlorination of the molecular sieve at elevated temperature, such as like taught in U.S. Pat. No. 4,308,172 to McDaniel whereby the molecular sieve is contacted at an elevated temperature with a chlorinating agent (e.g. $CCl_4$, $COCl_2$, $Cl_2$, $C_2Cl_4$, $SO_2Cl_2$ or $SOCl_2$), the resulting chlorinated molecular sieve is dechlorinated at an elevated temperature and the dechlorinated molecular sieve is oxidized at an elevated temperature. Another way to effect hydroxyl groups removal by chlorination is to contact the molecular sieve at an elevated temperature with a mixture containing oxygen and silicon tetrachloride.

The molecular sieve may be employed in the form of a dense compact fixed bed which is alternatively contacted with the feed mixture and displacement fluid. In the simplest embodiment of the invention, the molecular sieve is employed in the form of a single static bed in which case the process is only semi-continuous. In another embodiment, a set of two or more static beds may be employed in fixed bed contacting with appropriate valving so that the feed mixture is passed through one or more molecular sieve beds, while the displacement fluid can be passed through one or more of the other beds in the set. The flow of feed mixture and displacement fluid may be either up or down through the molecular sieve. Any of the conventional apparatus employed in static bed fluid-solid contacting may be used. Countercurrent moving bed or simulated moving bed countercurrent flow systems, however, have a much greater separation efficiency than fixed bed systems and are therefore preferred.

A dynamic testing apparatus is employed to test various molecular sieves with a particular feed mixture and displacement fluid to measure the molecular sieve characteristics of retention capacity and exchange rate. The apparatus consists of a helical molecular sieve chamber of approximately 70 cc volume having inlet and outlet portions at opposite ends of the chamber. The chamber is contained within a temperature control means and, in addition, pressure control equipment is used to operate the chamber at a constant predetermined pressure. Quantitative and qualitative analytical equipment such as refractometers, polarimeters and chromatographs can be attached to the outlet line of the chamber and used to detect quantitatively or determine qualitatively one or more components in the effluent stream leaving the molecular sieve chamber. A pulse test, performed using this apparatus and the following general procedure, is used to determine data for various molecular sieve systems. The molecular sieve is filled to equilibrium with a particular displacement fluid material by passing the displacement fluid through the molecular sieve chamber. At a convenient time, a pulse of feed containing known concentrations of a tracer and of a particular extract component or of a raffinate component or both, all diluted in displacement fluid is injected for a duration of several minutes. Displacement fluid flow is resumed, and the tracer and the extract component or the raffinate component (or both) are eluted as in a liquid-solid chromatographic operation. The effluent can be analyzed on-stream or alternatively, effluent samples can be collected periodically and later analyzed separately by analytical equipment and traces of the envelopes or corresponding component peaks developed.

From information derived from the test, molecular sieve performance can be rated in terms of void volume, retention volume for an extract or a raffinate component, and the rate of displacement of an extract component from the molecular sieve. The retention volume of an extract or a raffinate component may be characterized by the distance between the center of the peak envelope of the tracer component or some other known reference point. It is expressed in terms of the volume in cubic centimeters of displacement fluid pumped during this time interval represented by the distance between the peak envelopes. The rate of exchange of an extract component with the displacement fluid can generally be characterized by the width of the peak envelopes at half intensity. The narrower the peak width, the faster the displacement rate. The displacement rate can also be characterized by the distance between the center of the tracer peak envelope and the disappearance of an extract component which has just been displaced. This distance is again the volume of displacement fluid pumped during this time interval.

The following non-limiting working example is presented to illustrate the performance of the molecular sieve and is not intended to unduly restrict the scope of the claims attached hereto.

EXAMPLE

The above described pulse test apparatus was used to obtain data for this example. The liquid temperature was 60° C. and the flow was up the column at the rate of 1.2 ml/min. The feed stream comprised 20 wt. % distilled tall oil, and 80 wt. % displacement fluid. The column was packed with 23 wt. % Ludox bound silicalite which had been prepared as required in the practice of the present invention, including gelation by removal of water (drying) followed by treatment for removal of hydroxyl groups, which in this case was by heating in air at 1000° C. for 48 hours. The resulting molecular sieve was then ground and screened to 20–50 mesh. The displacement fluid used was 80 LV % methylethylketone and 20 LV % acetic acid.

The results of this example are shown on the accompanying FIGURE. It is immediately apparent from the FIGURE that the separation capable of being achieved by the present invention is excellent. The separation of the rosin acid from fatty acid curves is clear and distinct. Effective and practical separation of tall oil components has thus become a reality.

Additional runs on the pulse test apparatus were carried out, also in accordance with the present invention, but with different displacement fluids such as a propionic acid and heptane mixture and pentanoic acid. The results varied somewhat as to the quality of separation, but in all cases clear separations were achieved. The combination of organic acid and diluent as set forth in this example appears to be among the most effective.

The curves also illustrate that there is not a trace of the aforementioned reactivity between adsorbent and feed components or tailings of rosin acid components into the fatty acid components previously observed to occur with the silicalite with an organic binder and silicalite with a silica binder not thermally treated in accordance with the present invention.

What is claimed is:

1. A selectively adsorbent molecular sieve for separating tall oil components comprising silicalite in an inert silica matrix, said matrix comprising a gelled colloidal amorphous silica, said molecular sieve having substantially no hydroxyl groups thereon.

2. The sieve of claim 1 which has been extruded and broken into discrete particles.

3. A method of manufacturing a selectively absorbent molecular sieve comprising silicalite in an inert silica matrix, which method comprises:

(a) mixing silicalite powder into an aqueous colloidal dispersion of amorphous particles comprising discrete uniform spheres of silica which have substantially no internal surface area or detectable crystallinity dispersed in an alkaline medium which reacts with said silica surface to produce a negative charge;

(b) gelling said mixture; and (c) treating said gelled mixture in a manner effecting substantially complete elimination of hydroxyl groups on said molecular sieve.

4. The method of claim 3 wherein the pH of said alkaline medium is maintained from about 8.5 to about 11.0.

5. The method of claim 3 wherein sodium ions are present as stabilizing cations in said alkaline medium.

6. The method of claim 3 wherein ammonium ions are present as stabilizing cations in said alkaline medium.

7. The method of claim 3 wherein the concentration of silica in said colloidal dispersion comprises from about 30 wt. % to about 50 wt. % based on $SiO_2$.

8. The method of claim 3 wherein said gelling is effected by removing water from said mixture.

9. The method of claim 3 wherein said gelled mixture is extruded while in a plastic state and the extrudate broken into discrete particles prior to said elimination of hydroxyl groups.

10. The method of claim 3 wherein substantially complete elimination of hydroxyl groups on said molecular sieve is effected by thermally treating said gelled mixture at a temperature from about 450° C. to about 1000° C. for a minimum time of from about 3 hours to about 48 hours.

11. The method of claim 10 wherein said thermal treatment occurs in the presence of oxygen, nitrogen or hydrogen.

12. The method of claim 3 wherein substantially complete elimination of hydroxyl groups on said molecular sieve is effected by first contacting said molecular sieve with an alcohol and then thermally treating said molecular sieve at elevated temperature in the presence of oxygen.

13. The method of claim 3 wherein substantially complete elimination of hydroxyl groups on said molecular sieve is effected by chlorination at elevated temperature.

14. The method of claim 13 wherein said chlorination comprises contacting said molecular sieve at an elevated temperature with a chlorinating agent, dechlorinating the resulting chlorinated molecular sieve at an elevated temperature and oxidizing the dechlorinated molecular sieve at an elevated temperature.

15. The method of claim 13 wherein said chlorination comprises contacting said molecular sieve at an elevated temperature with a mixture containing oxygen and silicon tetrachloride.

* * * * *

UNITED STATES PATENT AND TRADEMARK OFFICE

CERTIFICATE OF CORRECTION

PATENT NO. : 4,560,675

DATED : December 24, 1985

INVENTOR(S) : Michael T. Cleary et al

It is certified that error appears in the above-identified patent and that said Letters Patent is hereby corrected as shown below:

In the claims, claim 3 line 1, correct the spelling of "adsorbent .

Signed and Sealed this

*Eighteenth* Day of *March 1986*

[SEAL]

*Attest:*

DONALD J. QUIGG

*Attesting Officer* *Commissioner of Patents and Trademarks*